US006987798B2

(12) United States Patent
Ahn et al.

(10) Patent No.: US 6,987,798 B2
(45) Date of Patent: Jan. 17, 2006

(54) SYSTEM AND METHOD FOR DEMODULATING MULTIPLE WALSH CODES USING A CHIP COMBINER

(75) Inventors: Seong-Woo Ahn, Yongin-shi (KR); Seo-Weon Heo, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 186 days.

(21) Appl. No.: 10/430,259

(22) Filed: May 7, 2003

(65) Prior Publication Data

US 2003/0210735 A1 Nov. 13, 2003

(30) Foreign Application Priority Data

May 7, 2002 (KR) ..................... 10-2002-0025061

(51) Int. Cl.
*H04B 1/69* (2006.01)

(52) U.S. Cl. ...................................... 375/148; 370/209

(58) Field of Classification Search ................ 375/130, 375/136, 137, 142, 143, 145, 147, 148, 140, 375/144, 150; 370/342, 335, 441, 332, 209, 370/208, 210, 320

See application file for complete search history.

(56) References Cited

U.S. PATENT DOCUMENTS 5,442,627 A * 8/1995 Viterbi et al. ............... 370/209
5,608,722 A * 3/1997 Miller ........................ 370/320
5,892,774 A * 4/1999 Zehavi et al. ............... 370/527
5,910,950 A * 6/1999 ten Brink ................... 370/342
5,930,305 A * 7/1999 Leib .......................... 375/324
6,295,311 B1 * 9/2001 Sun ........................... 375/147
6,496,706 B1 * 12/2002 Jou et al. .................... 455/522
6,700,881 B1 * 3/2004 Kong et al. ................. 370/335
6,717,976 B1 * 4/2004 Shen ......................... 375/147
6,792,034 B1 * 9/2004 Lee et al. ................... 375/148
6,810,255 B2 * 10/2004 Chen et al. ................. 455/437
2002/0126745 A1 * 9/2002 Prysby et al. .............. 375/148

* cited by examiner

*Primary Examiner*—Emmanuel Bayard
(74) *Attorney, Agent, or Firm*—Roylance Abrams Berdo & Goodman, L.L.P.

(57) ABSTRACT

Disclosed is a system and method for demodulating packet data channels with multiple Walsh codes in a CDMA mobile communication system supporting voice and packet data services. A plurality of fingers process signals received from a transmitter as inputs, perform despreading and channel compensation with spreading codes pre-assigned to the transmitter, and outputting the despread chip signals. A chip combiner combines the chip signals output from the plurality of fingers. A chip buffer stores the combined chip signals until decoding of the packet data control channels is completed and information on the multiple Walsh codes assigned to the packet data channels. Then, a multiple Walsh demodulator generates at least one Walsh symbol performing Walsh decovering of the combined chip signals using information on the multiple Walsh codes. Therefore, the system can efficiently demodulate data transmission channels using the multiple Walsh codes, and thus complexity of the system and demodulation time can be reduced.

34 Claims, 8 Drawing Sheets

SYSTEM AND METHOD FOR DEMODULATING MULTIPLE WALSH CODES USING A CHIP COMBINER

PRIORITY

This application claims priority under 35 U.S.C. § 119 to an application entitled "System and Method for Demodulating Multiple Walsh Codes Using Chip Combiner" filed in the Korean Industrial Property Office on May 7, 2002 and assigned Serial No. 2002-25061, the contents of which are hereby incorporated by reference.

BACKGROUND OF THE INVENTION

1. Field of the Invention

The present invention relates to a system and method for demodulating a communication signal in a mobile communication system, and more particularly to a system and method for efficiently demodulating data channels using multiple Walsh codes in mobile communication systems employing time division multiplexing (TDM) and code division multiplexing (CDM).

2. Description of the Related Art

Typical mobile communication systems, for example, those employing a code division multiple access (CDMA) mode, such as IS (International Standard)-2000, have supported voice and low-speed packet data services. However, based on user requests and enhancements in technology, mobile communication systems have become oriented to a high-speed packet data service. One of these mobile communication systems, such as IS-2000 1x-EVDV (Evolution in Data and Voice), has drawn a lot of attention recently as a system for supporting not only a voice service but also a high-speed packet data service. To allow such a mobile communication system to support a voice service and a high-speed packet data service, it is essential to construct mobile station equipment capable of processing data at a high speed.

In the conventional mobile communication systems which have been oriented to a voice data service and have employed a CDM mode in which Walsh codes are used to discriminate between channels, available Walsh codes are shared among a plurality of users. Thus, the conventional mobile communication systems are used in a way that one or more whole Walsh codes are assigned to one data channel. A typical rake receiver with a plurality of fingers performs demodulation with each assigned Walsh code by means of each finger. As a result of demodulation, symbols output from each finger are combined at a multi-path symbol combiner.

In the CDMA-based mobile communication systems supporting high-speed packet data transmission, available Walsh codes are variably assigned to each user to enable data to be transmitted at a high speed. That is, in high-speed data channels it is possible to use all the Walsh codes. In this manner, when the data channels spread with multiple Walsh codes are demodulated, a demodulator using an existing multi-path symbol combiner has a construction in which all the fingers must perform demodulation with respect to the multiple Walsh codes, so that overhead is increased, and the complexity of the receiver also increases as a whole.

Meanwhile, systems such as IS-2000 1x-EVDV which support high-speed data transmission are designed to use a packet data control channel transmitting control information in order to enhance the transmission efficiency of packet data channels, in which packet data channels are simultaneously transmitted from a base station together with the packet data control channels. The packet data channels can be assigned to different users per time intervals having a variable slot length (i.e., TDM) and also can be spread by a plurality of Walsh codes (i.e., CDM).

In the systems in which the packet data channels and the packet data control channels are transmitted simultaneously in this manner, until the packet data control channels are decoded and then information (or a Walsh space) on the multiple Walsh codes used in the packet data channels is extracted, demodulating of the pack data channels can be delayed. Thus, until decoding of the packet data control channels is completed, data transmitted to the packet data channels must be temporarily buffered. In order to process both channels, the receiver design becomes complex.

SUMMARY OF THE INVENTION

Accordingly, the present invention has been made to solve the above-mentioned problems occurring in existing systems, and an object of the present invention is to provide a system and method for efficiently demodulating data channels transmitted using multiple Walsh codes in a mobile communication system for a high-speed data service.

It is another object of the present invention to provide a system and method for efficiently demodulating packet data channels when code division multiplexing is used, so as to simultaneously support a packet data service for a plurality of users, and make use of dedicated packet data control channels to enhance a packet data transmission efficiency.

In order to substantially accomplish these objects, according to an embodiment of the present invention, a system for demodulating signals received through packet data channels using information on the packet data channels in a wireless packet data communication system, in which the information is received through packet data control channels and the communication supports code division multiplexing is provided. The system for demodulating signals comprises a plurality of fingers for processing signals received from a transmitter as inputs and for outputting chip signals performing despreading with pre-assigned spreading codes; a chip combiner for combining the chip signals output from the plurality of fingers; a multiple Walsh demodulator for generating Walsh symbols for performing Walsh decovering of each of the chip signals combined by the chip combiner using all Walsh codes available to the packet data channels, and when decoding of the packet data control channels is completed and information on multiple Walsh codes assigned to the packet data channels is obtained, selecting and outputting at least one Walsh symbol corresponding to the multiple Walsh codes from among the Walsh symbols; and a demapping section for demapping at least one Walsh symbol corresponding to the multiple Walsh codes output from the multiple Walsh demodulator according to a modulation mode of the packet data channels obtained by completing decoding of the packet data control channels.

Further, in order to substantially accomplish these objects, according to an embodiment of the present invention, a system for demodulating signals received through packet data channels using information on the packet data channels in a wireless packet data communication system, in which the information is received through packet data control channels and the communication supports code division multiplexing is provided. The system for demodulating signals comprises a plurality of fingers for processing signals received from a transmitter as inputs and for outputting chip signals for performing despreading with pre-assigned spreading codes; a chip combiner for combining the chip signals output from the plurality of fingers; a chip buffer for storing the combined chip signals; a multiple Walsh demodulator for outputting at least one Walsh symbol for performing Walsh decovering of the chip signals stored on the chip buffer using information on the multiple Walsh codes, when decoding of the packet data control channels is completed and information on multiple Walsh codes assigned to the packet data channels is obtained; and a demapping section for demapping at least one Walsh symbol output from the multiple Walsh demodulator according to a modulation mode of the packet data channels obtained by completing decoding of the packet data control channels.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
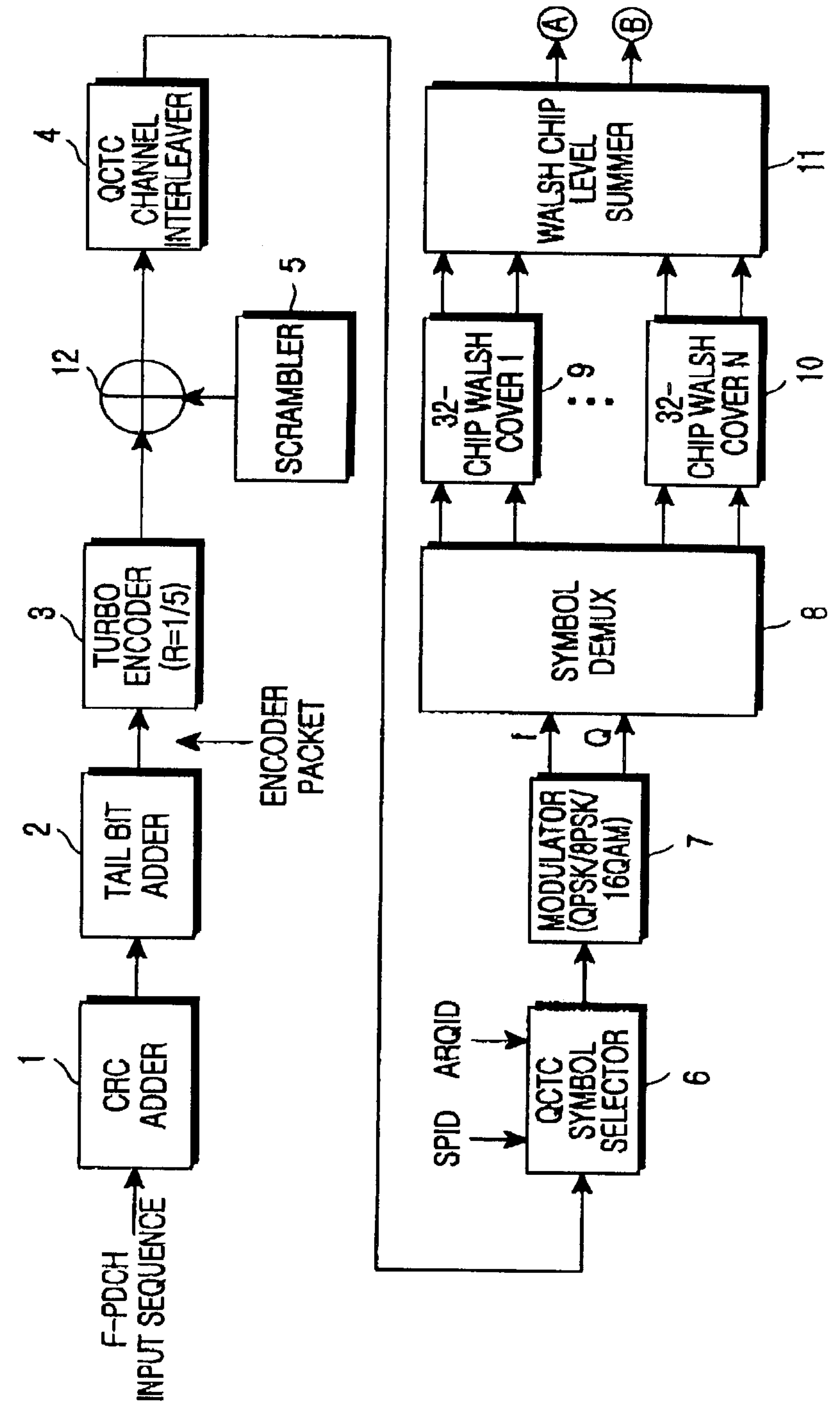
FIG. 1 is a block diagram illustrating an example of components of a modulator for forward packet data channels (F-PDCH) which are used for a packet data service.

Hereinafter, embodiments of the present invention will be described in detail with reference to the accompanying drawings. It should be noted that similar parts are given reference numerals and symbols as similar as possible throughout the drawings. In the following description, numerous specific details are set forth, such as components of a specific circuit, etc., to provide a thorough understanding of the present invention. However, it will be obvious to those skilled in the art that the present invention may be practiced without such specific details. In the description of the present invention, a detailed description of known functions and configurations have been omitted for conciseness.

The present invention described below is directed to a structure of a receiver. This receiver has a capability to efficiently demodulate packet data channels which are subjected to spreading, in particular, using multiple Walsh codes in a mobile communication system which supports multimedia services using a bandwidth for IS-2000 1x, wherein the multimedia services includes voice, low-speed circuit data and high-speed packet data services. Further, the receiver can also be applied when code division multiplexing (CDM) is used to support a plurality of packet data channels.

Hereinafter, a description will be made regarding major forward channels, which need to provide data services in a high-speed packet transmission mode in the mobile communication system used in the present invention.

The forward link channels for a packet data service used in the present invention are generally classified into a common channel, control channels and traffic channels. Hereinafter, a capital, "F-", accompanied in front of the name of the channels refers to a forward link in a direction from a base station to a mobile station.

The common channel refers to a pilot channel (PICH), providing a reference amplitude and a quantity of phase shift, both of which are used for synchronous modulation at the mobile station. The traffic channels includes packet data channels (F-PDCH) through which packet data are transmitted effectively. The control channel consists a packet data control channel for transmitting demodulation information of the traffic channels.

The packet data control channel (F-PDCCH) transmits information on how many slots constitute a packet transmitted in a forward direction, and various control information, which contain a media access control identifier (MAC_ID) denoting a user to whom a packet is transmitted in a forward direction, a sub-packet identifier (SP ID) denoting retransmission number of the transmitted packets, an automatic repeat request identifier (ARQ ID) denoting which of four ARQ channels transmitted in parallel contains a transmitted packet, an encoder packet size (EP SIZE) denoting a size of the encoder packet transmitted, and so forth. Further, additional information on the CDM may include a Walsh space indicator denoting the multiple Walsh codes assigned to packet data channel and a CDM channel indicator.

FIG. 1 is a block diagram illustrating an example of components of a modulator for forward packet data channels (F-PDCH) which are used for a packet data service.

Referring to FIG. 1, each of the F-PDCHs has an input sequence, to which a 16-bit CRC (Cyclic Redundancy Check Code) is added by a 16-bit CRC adder 1. Subsequently, the input sequence is subjected to the addition of tail bits for turbo encoding at a tail bit adder 2, and then to turbo encoding at a predetermined code rate, R=⅕, at a turbo encoder 3. The input sequence is an encoder packet (EP) having an input sequence that functions as one unit and is encoded at the turbo encoder 3.

Output symbols encoded at the turbo encoder 3 are subjected to a logical XOR (Exclusive Or) operation with outputs of a scrambler 5 by means of an adder 12, so that data scrambling is performed. Output symbols of the adder 12 are interleaved by a QCTC (Quasi Complementary Turbo Code) channel interleaver 4 according to a specific interleaving rule, and then subjected to symbol selection at a QCTC symbol selector 6 according to an SP ID and an ARQ ID. The selected symbols are referred to as a SP (Sub-Packet). Whenever the selected symbols are retransmitted, the SP made up of different symbols is selected.

The symbols selected at the QCTC symbol selector 6 are input into a modulator 7, which generates and outputs I/Q symbol pairs using a modulation order of any one of QPSK (Quadrature Phase Shift Keying), 8PSK (8-ary Phase Shift Keying) and 16QAM (16-ary Quadrature Amplitude Modulation). The I/Q symbol pairs are input into a symbol DEMUX 8, which demultiplexes the I/Q symbol pairs into respective I/Q channels as many times as the number, N, of the available Walsh codes which can be used for the packet data channels at the base station (where, N=1 to 28). Here, the I/Q channels refer to Walsh code channels, which are spread with different Walsh codes.

Outputs demultiplexed at the symbol DEMUX 8 are spread with 32-chip Walsh codes, which correspond from a $1^{st}$ Walsh cover 9 to an $N^{th}$ Walsh cover 10, respectively. Outputs of the Walsh covers 9 to 10 are summed for each I/Q channel at a Walsh chip level summer 11. I/Q output signals summed at the Walsh chip level summer 11 are transmitted through respective lines A and B to a forward link transmitter shown in FIG. 3.

Figure 2:
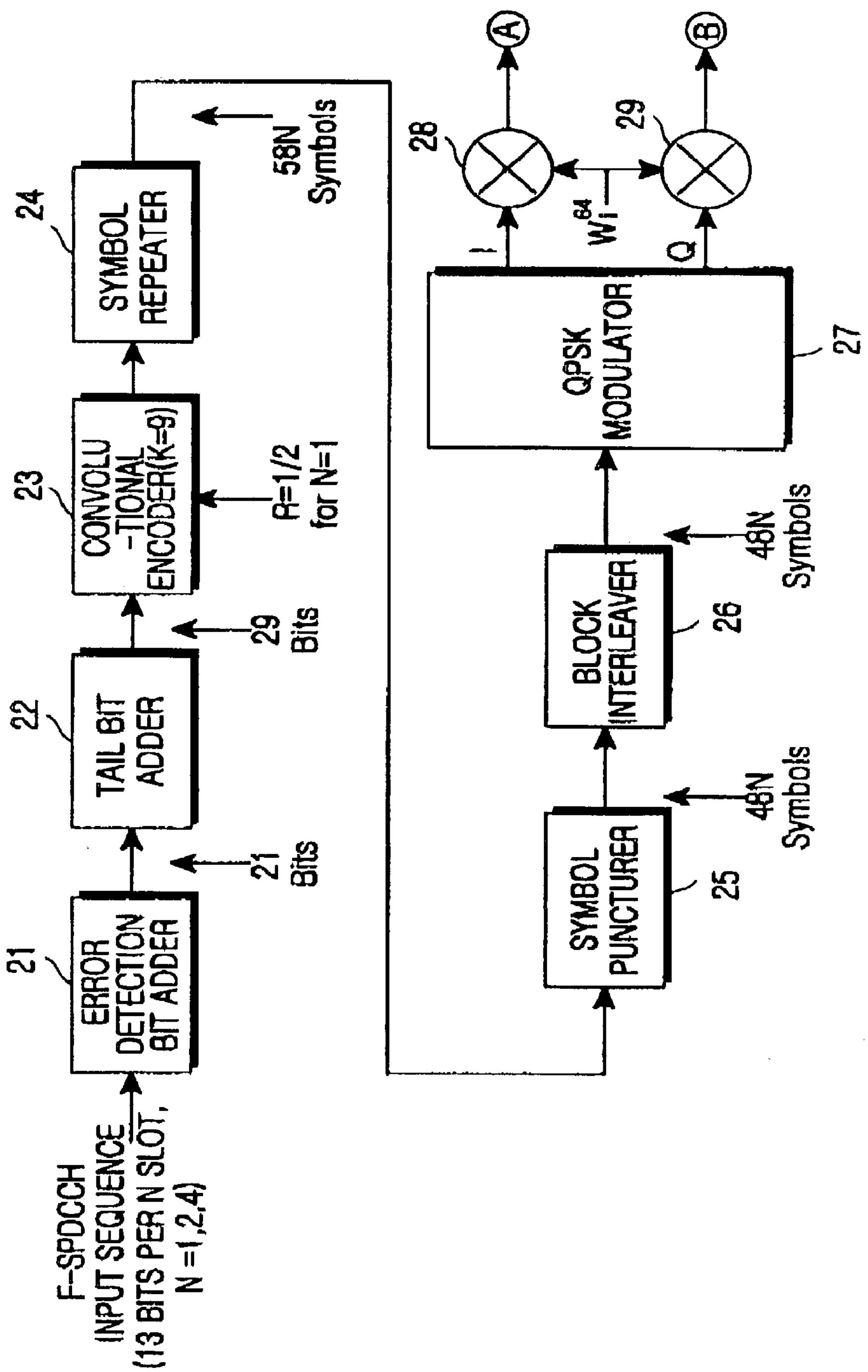
FIG. 2 is a block diagram illustrating an example of components of a modulator for a forward packet data control channel (F-PDCCH) which is used for a packet data service.

FIG. 2 is a block diagram illustrating an example of components of a modulator for a forward packet data control channel (F-PDCCH) which is used for a packet data service.

Referring to FIG. 2, the F-PDCCH has an input sequence, which contains control information of total 13 bits including a 6-bit MAC_ID (not shown) for identifying a user, a 2-bit SP ID (not shown) for identifying retransmission number of an encoder packet, a 2-bit ARQ ID (not shown) for identifying an ARQ channel, and a 3-bit encoder packet size (not shown). When the input sequence is used for CDM, the input sequence further contains additional information (e.g., a Walsh space indicator and a CDM channel indicator).

The 13-bit control information transmitted through the F-PDCCH is determined per each N slot, where N has a value determined by a length of the sub-packet transmitted through the F-PDCH. For example, N is 1 for SUBPACKET_LENGTH=1, N is 2 for SUBPACKET_LENGTH=2, and N is 4 for SUBPACKET_LENGTH=4 and 8.

The 13-bit control information has 8 bits of error detection added at an error detection bit adder 21 and 8 bits of tail bits added at a tail bit adder 22, and then is encoded with a constraint length, K=9, at a convolutional encoder 23. The convolutional encoder 23 has a code rate, R, in which R is ½ for N=1, and R is ¼ for N=2 and 4.

When N=4, a symbol repeater 24 repeats outputs of the convolutional encoder 23 two times and outputs the repeated outputs. A symbol puncturer 25 punctures 10N symbols according to a predetermined puncturing rule and outputs 48N symbols, from among 58N symbols output from the symbol repeater 24. The punctured outputs are interleaved at a block interleaver 26 according to a predetermined interleaving rule, and then modulated to I/Q symbols at a QPSK modulator 27. Multipliers 28 and 29 multiply 64 bits of Walsh codes denoting the F-PDCCH by the I/Q symbols output from the QPSK modulator 27, and then spread the multiplied resultants. The spread I/Q output signals are transmitted through respective lines A and B to a forward link transmitter shown in FIG. 3.

Figure 3:
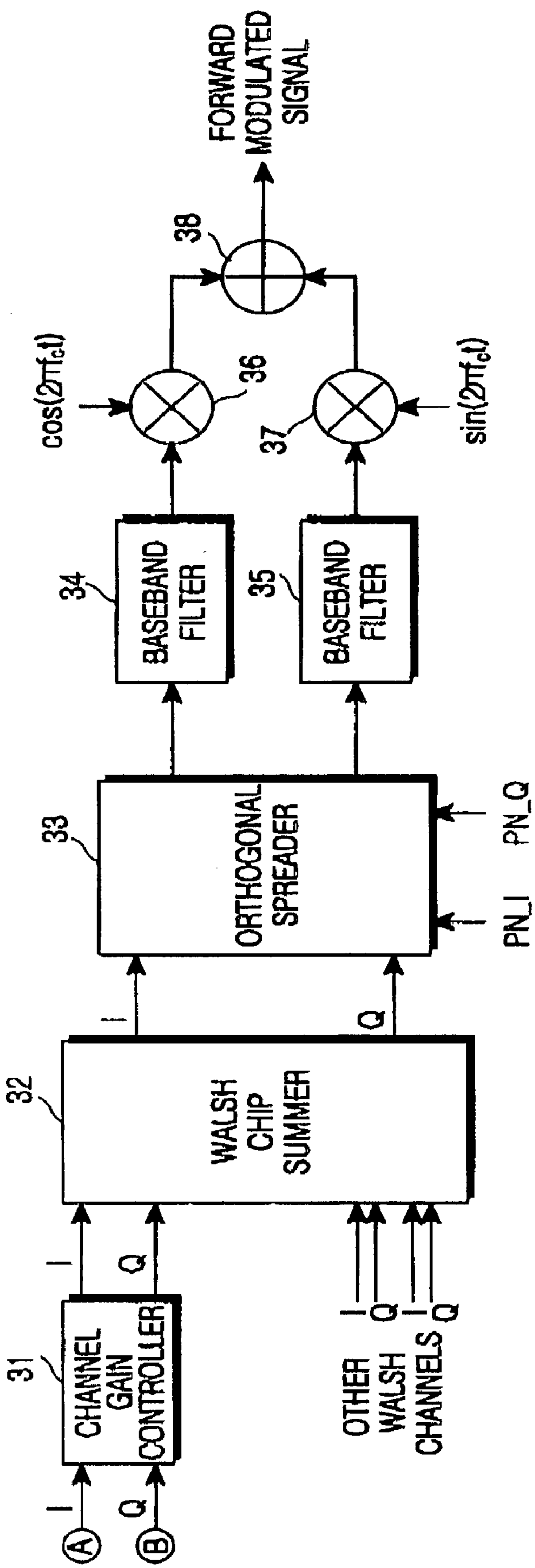
FIG. 3 is a block diagram illustrating an example of components of a forward link transmitter for a packet data service.

FIG. 3 is a block diagram illustrating an example of components of a forward link transmitter for a packet data service.

Referring to FIG. 3, I/Q signals input from forward Walsh channels (e.g., F-PDCHs, F-PDCCH) are multiplied by a gain corresponding to each channel at a channel gain controller 31, and then summed according to each of the I/Q channels at a Walsh chip summer 32.

I/Q outputs summed by the Walsh chip summer 32 are multiplied by PN_I and PN_Q at an orthogonal spreader 33, in which both PN_I and PN_Q are pseudo-random noise (PN) spread codes which are pre-assigned to a transmitter of the corresponding base station, thereby being subjected to PN spreading, and then input into baseband filters 34 and 35 and filtered there. Outputs of the baseband filters 34 and 35 are multiplied by $\cos(2\pi f_c t)$ and $\sin(2\pi f_c t)$ (where, $f_c$ is the carrier frequency) at respective multipliers 36 and 37, and then summed at a summer 38, and finally transmitted to an antenna (not shown).

Figure 4:
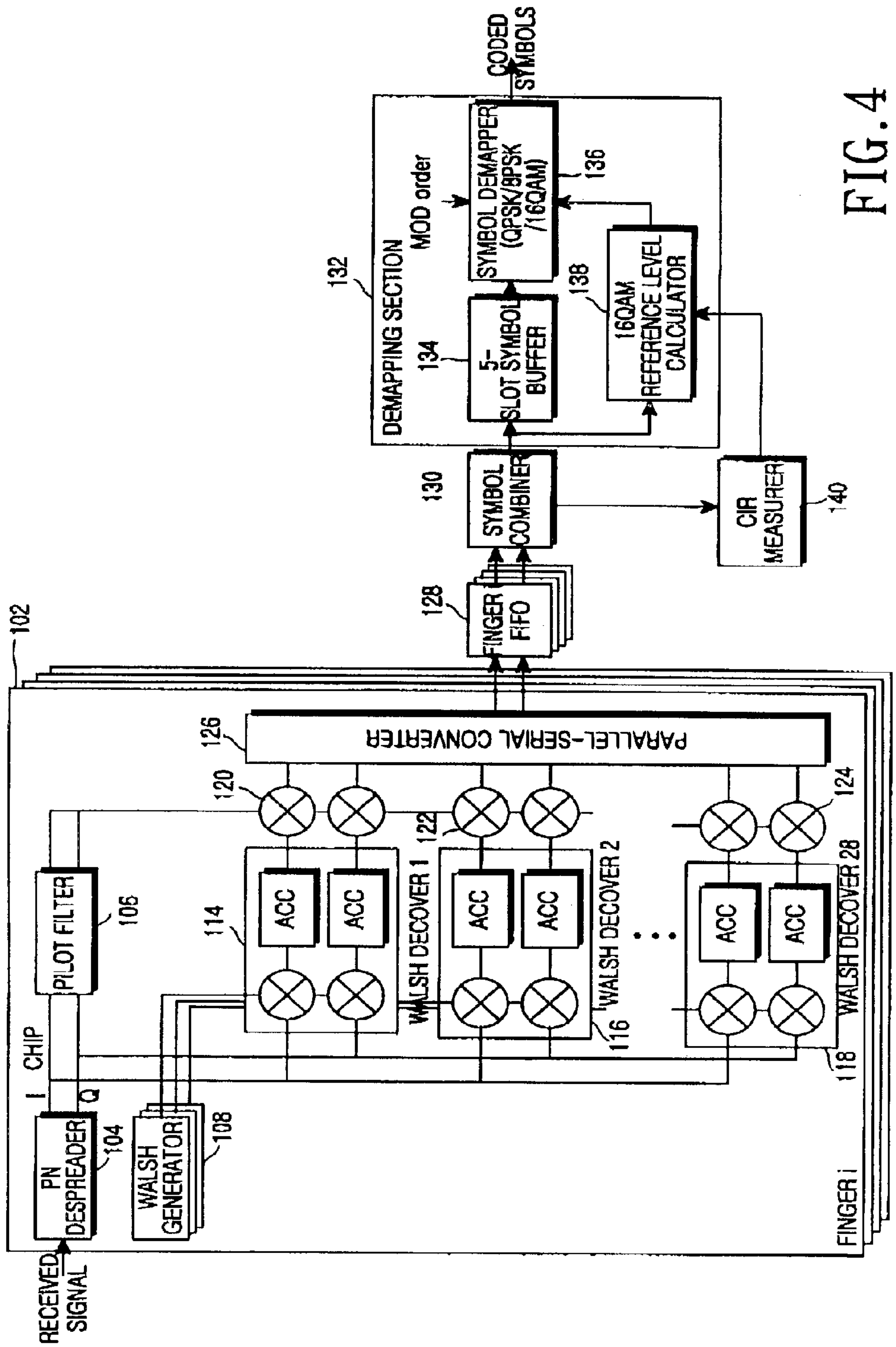
FIG. 4 is a block diagram illustrating an example of components of a receiver for a mobile station, in which the receiver makes use of a single data path and a single symbol combiner in order to demodulate F-PDCHs of TDM mode.

FIG. 4 is a block diagram illustrating an example of components of a receiver for a mobile station, in which the receiver makes use of a single data path and a single symbol combiner in order to demodulate F-PDCHs of TDM mode. The demodulator shown in this drawing is referred to as a symbol combining multiple Walsh (SCMW) demodulator which makes use of symbol combination. It is assumed that information on multiple Walsh codes assigned to packet data channels is known.

Referring to FIG. 4, signals received from a base station are input into a plurality of fingers 102, respectively, and are subjected to despreading with PN codes, which have been assigned to the corresponding base station, at a PN despreader 104. The despread signals are Walsh spread chip signals, being provided to $1^{st}$ to $28^{th}$ Walsh decovers 114, 116 and 118 and being input into a pilot filter 106. The pilot filter 106 extracts pilot components included in the despread chip signals to obtain channel estimation values, and then inputs the obtained resultants into $1^{st}$ to $28^{th}$ multipliers 120, 122 and 124.

The number of the whole Walsh codes, which can be generated at a length of 32 chips, is 32. Excluding Walsh codes assigned to a common channel, etc., from among the whole Walsh codes, the maximum number of Walsh codes, which can be assigned to packet data channels, is 28. Therefore, of 28 Walsh generators 108, the corresponding Walsh generators generate Walsh codes known to be assigned to the packet data channels. The $1^{st}$ to $28^{th}$ Walsh decovers 114, 116 and 118 are subjected to decovering of outputs of the PN despreader 104 with the Walsh codes. The decovered outputs will be referred to as Walsh symbols or demodulation symbols.

Outputs of the $1^{st}$ to $28^{th}$ Walsh decovers 114, 116 and 118 are each multiplied by outputs of the pilot filter 106 at the $1^{st}$ to $28^{th}$ multipliers 120, 122 and 124, thereby being subjected to channel compensation and then input into a parallel-serial converter 126. (The multipliers may be referred to as channel compensators) The parallel-serial converter 126 converts outputs of the $1^{st}$ to $28^{th}$ multipliers 120, 122 and 124 in series.

Symbols output from the plurality of fingers 102 are temporarily stored on FIFOs (First Input First Output) corresponding to the corresponding fingers from among a plurality of FIFOs 128, and then combined by a symbol combiner 130, and finally provided to a demapping section 132 and a CIR (Carrier to Interference Ratio) measurer 140. The FIFOs 128 is for compensating for a multipath delay offset difference between multiple paths caused by the fingers.

A symbol buffer 134 stores the combined output symbols provided from the demapping section 132 for a time corresponding to five slots. Then, after decoding of F-PDCCH is completed, according to the decoding result if it indicates that F-PDCHs are assigned to itself and obtains information on a modulation mode of F-PDCH, the symbol buffer 134 provides the stored resultants to a symbol demapper 136. Here, when MAC_ID, which is included in control information obtained as a decoding result of F-PDCCH, is identical to that of a mobile station, the mobile station determines that F-PDCHs are assigned to itself within the same time interval.

The symbol demapper 136 demaps symbols reading out of the symbol buffer 134 to coded symbols using a demodulation mode corresponding to the modulation mode. When 16QAM modulation is performed, a reference level of received symbols is needed for demapping. Thus, 16QAM reference level calculator 138 calculates a reference level for the 16QAM from CIR measurement results of the CIR measurer 140 and combined outputs of the symbol combiner 130, and provides the calculated resultants to the symbol demapper 136.

In the SCMW demodulator operated as mentioned above, information on the number of Walsh codes is changed per each time interval, so that a process procedure up to multiple Walsh code decovers 114, 116 and 118 can be carried out without making reference to the control information of the F-PDCCH. However, it is difficult to know a modulation mode used for packet data channels until the F-PDCCH is received. Therefore, after reception of the F-PDCCH is successfully completed, symbol demapping can be performed by the symbol demapper 136. For this reason, outputs of the symbol combiner 130 must be stored on the symbol buffer 134 until the F-PDCCH is completely decoded.

Control information transmitted through the F-PDCCH has a length of a maximum four slots. Because modulation symbols, which are continuously received during processing from decoding of the F-SPDCCH to demodulating of the F-PDCH, must be stored, the symbol buffer 134 has a capacity to store the modulation symbols received for a maximum five slots.

In a CDMA system using one slot of 1.25 ms and a chip speed of 1.2288 Mcps, provided that the number of chips within one slot is 1536 and the number of available Walsh codes is a maximum 28, a size of the symbol buffer 134 required to demodulate the F-PDCHs is 6720 symbols (5*1536*28/32). In particular, the 1xEVDV supports ARQ (Automatic Repeat reQuest) through feedback of ACK (Acknowlege)/NACK (Nacknowledge) of a transmitting packet, so that the 1xEVDV is subjected to a great constraint to demodulation time of the F-PDCH due to a feedback delay. Therefore, it is essential to design an efficient demodulator which can reduce a process delay and complexity of a receiver.

When the parallel-serial converter 126 for parallel-serial conversion of Walsh code channels is arranged behind the multipath symbol combiner 130, a demodulation process of the F-PDCHs until the parallel-serial conversion is performed requires 28 data paths and 28 multipath symbol combiners.

In reality, in a modem ASIC (Application Specific Integrated Circuit) including such a demodulator, an area and consumption of electric power which connection lines occupy are never negligible. In addition, 28 combiners make the design of the modem ASIC inefficient. Therefore, when the parallel-serial converter 126 having a relatively low complexity as shown in FIG. 4 is arranged directly behind the Walsh decovers 114, 116 and 118, a relative efficient demodulator can be constructed because it is sufficient to use only one data path and one multipath symbol combiner 130 behind the fingers 102.

However, the structure as in FIG. 4 can not support F-PDCHs of CDM mode. That is, in the 1xEVDV using the F-PDCHs of CDM mode, the different Walsh code channels from each other are assigned to each mobile station, so that whenever packets are transmitted, information on the Walsh codes assigned to the corresponding mobile station must be transmitted. This information is transmitted through F-PDCCH, and thus the mobile station can not know the information on the Walsh codes assigned to it until the F-PDCCH is completely decoded.

To support this CDM, the foregoing problem must be solved in two ways, a post-decovering method and a priori-decovering method, in which the post-decovering method performs multiple Walsh code decovering after decoding of the F-PDCCH is completed, and the priori-decovering method performs Walsh selection and parallel-serial conversion when, as a result of decoding of the F-PDCCH after the F-PDCHs are previously decovered according to each Walsh code, information on the Walsh codes is informed.

In case of the post-decovering method, chip signals which are subjected to PN despreading ahead of the multiple Walsh demodulator must be buffered. In this case, the typical demodulator needs a 5-slot chip buffer for each finger, thus having excessive complexity. Further, because the number of desired buffers is proportional to that of the fingers, provided that the number of fingers is 4, only a finger end needs a very large buffer size, for example, of 30720 chips (4 fingers* 5 slots*1536 chips).

Figure 5:
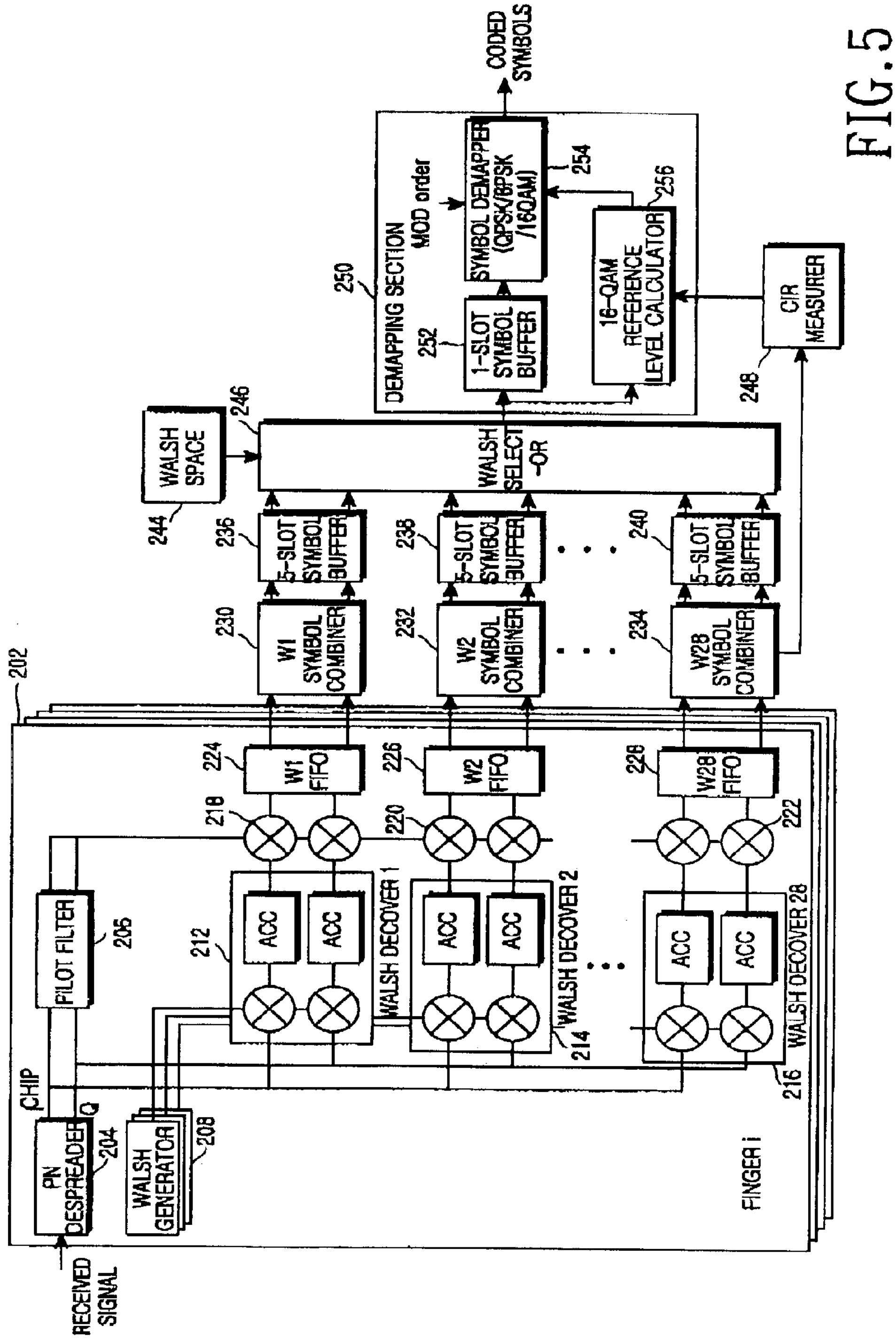
FIG. 5 is a block diagram illustrating an example of components of a receiver for a mobile station, in which the receiver performs priori-decovering when fingers are used together with symbol combiners in order to demodulate F-PDCHs of CDM mode.

FIG. 5 is a block diagram illustrating an example of components of a receiver for a mobile station, in which the receiver performs priori-decovering when fingers are used together with symbol combiners in order to demodulate F-PDCHs of CDM mode. In this drawing, the receiver is also called a symbol combining parallel Walsh (SCPW) demodulator, because the receiver has data paths constructed in parallel between each symbol combiner and each Walsh code.

Referring to FIG. 5, signals received from a base station are input into a plurality of fingers 202, respectively, and then are subjected to despreading with PN codes, which are assigned to the corresponding base station, at a PN despreader 204. The despread signals are Walsh spread chip signals, being provided to $1^{st}$ to $28^{th}$ Walsh decovers 212, 214 and 216 and being input into a pilot filter 206. The pilot filter 206 extracts pilot components including the despread chip signals to obtain estimated values of channels, and then inputs the obtained resultants into $1^{st}$ to $28^{th}$ multipliers 218, 220 and 222.

28 Walsh generators 208 generate all 28 Walsh codes, which can be assigned to packet data channels. The $1^{st}$ to $28^{th}$ Walsh decovers 212, 214 and 216 perform decovering of outputs of the PN despreader 204 with the 28 Walsh codes to output Walsh symbols. These Walsh symbols output from the $1^{st}$ to $28^{th}$ Walsh decovers 212, 214 and 216 are each multiplied by an output of the pilot filter 206 at the $1^{st}$ to $28^{th}$ multipliers 218, 220 and 222, thereby being subjected to channel compensation, and then are stored on $1^{st}$ to $28^{th}$ Walsh FIFOs 224, 226 and 228. The $1^{st}$ to $28^{th}$ Walsh FIFOs 224, 226 and 228 store the decovered symbols with Walsh codes corresponding to one another, and compensate for a multipath delay offset difference between multiple paths caused by the fingers 202.

Symbols stored on the $1^{st}$ to $28^{th}$ Walsh FIFOs 224, 226 and 228 are each combined according to each I, Q channel at $1^{st}$ to $28^{th}$ symbol combiners 230, 232 and 234, and then stored on $1^{st}$ to $28^{th}$ 5-slot symbol buffers 236, 238 and 240 according to each Walsh symbol and provided to a CIR measurer 248.

When decoding of F-PDCCH is completed, it is determined that F-PDCHs are assigned to the mobile station itself, and information on multiple Walsh codes and on a modulation mode are obtained, the Walsh selector 246 allows the symbols stored on the $1^{st}$ to $28^{th}$ 5-slot symbol buffers 236, 238 and 240 to be input, and then selects symbols decovered with the corresponding multiple Walsh codes in reference with a Walsh space 244, and finally converts the selected symbols in series. Here, the Walsh space 244 has information on the multiple Walsh codes obtained as a result of decoding the F-PDCCH.

The symbols selected at the Walsh selector 246 are stored per each slot on a 1-slot symbol buffer 252 of a demapping section 250, and then demapped to coded symbols by a symbol demapper 254 using a demodulation mode corresponding to the corresponding modulation mode. Here, information on the corresponding modulation mode is acquired by decoding of the F-PDCCH. When the modulation mode is the 16QAM, a 16QAM reference level calculator 256 calculates a reference level for the 16QAM from both CIR measurement results of the CIR measurer 248 and symbols selected at the Walsh selector 246, and then provides the calculated reference level to the symbol demapper 254 to be used to perform 16QAM demapping.

With a construction as in FIG. 5, except for the Walsh FIFOs 224, 226 and 228 used to compensate for a delay offset between fingers 202, both 28 5-slot symbol buffers 236, 238 and 240 for storing the Walsh decovered symbols and a single 1-slot symbol buffer 252 for calculating the reference level are required. That is, the size of the desired buffer becomes 8064 symbols (28 Walshes*5 slots*48 symbols+28 Walshes*48 symbols).

In the post-decovering method, chip signals, which are subjected to PN despreading ahead of the multiple Walsh demodulator, must be stored on the buffer. In this case, the typical demodulator needs a 5-slot chip buffer for each finger, so that complexity of the finger end is increased. If four fingers are used, a buffer size of 30720 chips (4 fingers*5 slots*1536 chips) is required only at the finger's end. In contrast, the priori-decovering method shown in FIG. 5 needs a relative small buffer size, but a modem ASIC is complex because a structure of the finger end is still complicated and because 28 symbol combiners 230, 232 and 234 each have a data path.

To decrease these complexities, when slim fingers for performing PN despreading and channel compensation are only used along with a multipath chip combiner, demodulation can be efficiently performed on the F-PDCHs using multiple Walsh codes. Here, the term "slim" refers to functions, such as Walsh decovering, Walsh selection and so on, are eliminated compared with the typical fingers. The term will be used throughout the specification.

Figure 6:
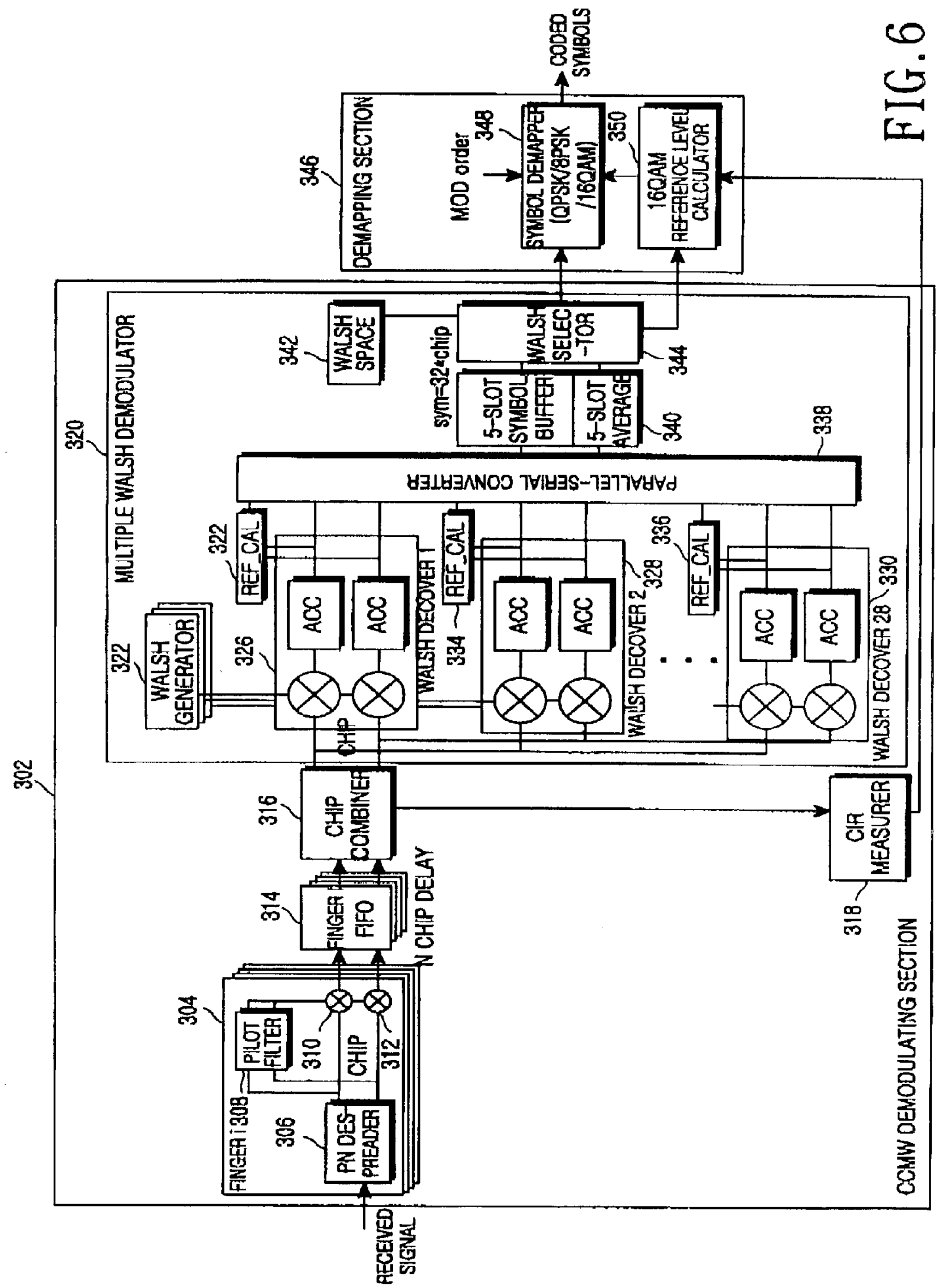
FIG. 6 is a block diagram illustrating an example of components of a demodulator for a mobile station according to an embodiment of the present invention, in which the demodulator includes a chip combining multiple Walsh (CCMW) demodulating section in order to demodulate F-PDCHs of CDM mode.

FIG. 6 is a block diagram illustrating an example of components of a demodulator for a mobile station according to an embodiment of the present invention, in which the demodulator includes a chip combining multiple Walsh (CCMW) demodulating section in order to demodulate F-PDCHs of CDM mode. As shown, the CCMW demodulating section 302 includes three main parts of the slim fingers 304, a chip combiner 316 and a multiple Walsh demodulator 320, and is connected to a demapping section 346.

To design a CDM F-PDCH demodulator, complexity, memory efficiency and processing time must be all taken into consideration. The CCMW demodulating section 302 is directed to gains in its design by arranging a Walsh decovering part (i.e., $1^{st}$ to $28^{th}$ Walsh decovers 326, 328 and 330) behind a multipath combiner (i.e., a chip combiner 316) in the configuration of an existing SCPW demodulator using fingers and a symbol combiner.

Referring to FIG. 6, received signals are input into a plurality of slim fingers 304, and then subjected to despreading with PN codes assigned to the corresponding base station at a PN despreader 306. The despread signals are input into a pilot filter 308. The pilot filter 308 extracts pilot components included in the despread chip signals to obtain channel estimation values of channels. Thus the obtained values are input into multipliers 310 and 312 for each of I and Q channels. The multipliers 310 and 312 perform channel compensation for a chip level by multiplying outputs of the pilot filter 308 by the PN despread chip signals, and then store the performed resultants on the corresponding one of a plurality of finger FIFOs 314. (The multipliers may be referred to as channel compensators) The finger FIFOs 314 compensate for a multipath delay offset difference between multiple paths caused by the slim fingers 304.

The chip combiner 316 combines the chip signals, which are stored on the plurality of finger FIFOs 314, by the chip, and then provides the combined chip signals both to the $1^{st}$ to $28^{th}$ Walsh decovers 326, 328 and 330 in the multiple Walsh demodulator 320 and to a CIR measurer 318. 28 Walsh generators 322 generate all 28 Walsh codes, which can be assigned to packet data channels, and inputs them into the $1^{st}$ to $28^{th}$ Walsh decovers 326, 328 and 330.

Each of the $1^{st}$ to $28^{th}$ Walsh decovers 326, 328 and 330 performs decovering of the chip signals combined at the chip combiner 316 with the 28 Walsh codes, and then outputs the decovered chip signals as Walsh symbols. The Walsh symbols output from the $1^{st}$ to $28^{th}$ Walsh decovers 326, 328 and 330 are converted in series by a parallel-serial converter 338, and then stored sequentially on a 5-slot symbol buffer 340.

When decoding of F-PDCCH is completed, it is determined that F-PDCHs are assigned to the mobile station itself, and information on multiple Walsh codes and a modulation mode are obtained, the Walsh selector 344 allows the symbols stored on the 5-slot symbol buffer 340 to be input, and then selects symbols decovered with the Walsh codes assigned to the packet data channels in reference with a Walsh space 342. Here, the Walsh space 342 has information on the multiple Walsh codes assigned to the packet data channels.

The selected symbols are provided to a demapping section 346. The symbols provided to the demapping section 346 are demapped to coded symbols by a symbol demapper 348 using a demodulation mode corresponding to the corresponding modulation mode. Here, information on the corresponding modulation mode is obtained by decoding of the F-PDCCH. When the modulation mode is the 16QAM, a 16QAM reference level calculator 350 calculates a 16QAM reference level from the symbols selected by the Walsh selector 344, and then provides the calculated reference level to the symbol demapper 348 to perform 16QAM demapping.

In the demodulating section 302 of FIG. 6 operating as mentioned above, the slim fingers 304 perform only channel compensation for a chip level with respect to PN despread signals, and store the performed resultants on the finger FIFOs 314. The slim fingers 304 eliminate a burden on multiple Walsh demodulation to each finger by removing the function for performing Walsh decovering from typical fingers.

Comparing the demodulating section 302 of FIG. 6 with that of FIG. 5, the demodulating section 302 of FIG. 6 can not only reduce a burden on channel compensation according to 28 Walsh codes from the viewpoint of hardware, but also perform a more precise channel compensation because it is possible to perform the channel compensation for a chip level. Here, a unit of the channel compensation performed by the pilot filter may be decided variably. In particular, because there is no necessity to buffer symbols until decoding of F-PDCCH is completed at the finger end, the finger can be very simply constructed. Even though the number of the slim fingers 304 is increased to enhance demodulation performance, the demodulator has a small burden as a whole, except that a buffer size demanded for finger FIFOs 314 is increased.

The finger FIFOs 314 shown in FIG. 6 stores 32 chips, thus requiring a buffer size 32/28 as large as the FIFOs 224, 226 and 228 of FIG. 5 which store 28 symbols per 32-chip, but are even more efficient than the construction of FIG. 5 in that complexity of the finger terminal end can be greatly reduced.

The chip combiner 316 allows the chip signals stored on the finger FIFOs 314 to be input, and compensates for a multipath delay to perform combining of chip levels. Therefore, even without information on the multiple Walsh codes assigned to packet data channels, the demodulator of FIG. 6 can perform multipath combining and requires only one data path and one multipath combiner 316.

The multiple Walsh demodulator 320 performs Walsh selection and parallel-serial conversion when information on the multiple Walsh codes as a result of decoding F-PDCCH after performing decovering in advance with respect to all Walsh codes which are assignable to packet data channels (priori-decovering). Because a modulation mode of the F-PDCHs may be revealed after decoding of the F-PDCCH is completed, the demapping section 346 can perform demapping after a maximum four slots. Thus, the symbol buffer 340 buffers symbols corresponding to a maximum five slots.

When the modulation mode of the 16QAM is used at the F-PDCHs, to determine a reference level the reference level must be estimated by measuring an average energy of one-slot modulation symbols per each slot. These modulation symbols are generated by Walsh decovering. Thus, to obtain the reference level, information on the multiple Walsh codes is needed. That is, it is not until decoding of the F-PDCCH is completed and then information on the multiple Walsh codes is obtained that it is possible to estimate the reference level. In this case, the average energy of the modulation symbols may be measured whenever each slot is demodulated, which requires time to calculate the measurements. For this reason, process delay for F-PDCH demodulation is increased.

Thus, the CCMW demodulating section 302 shown in FIG. 6 performs Walsh decovering with all 28 Walsh codes with respect to the chip signals output from the chip combiner 316, and then stores the resultants on a 5-slot symbol buffer 340. Reference symbol energy calculators (REF_CALs) 332, 334 and 336 according to each Walsh code pre-calculate reference symbol energy values of modulation symbols for one slot duration with the corresponding Walsh codes, respectively, and then store the calculated values in a separate memory area (referred to as a 5-slot average) corresponding to the 5-slot symbol buffer 340.

In this manner, the multiple Walsh demodulator 320 performs both Walsh decovering and measurement of the reference symbol energy in advance with respect to received chip signals, per each slot and stores the resultants on the symbol buffer 340. Then, when decoding of the F-PDCCH is completed, information on both a modulation mode of the F-PDCHs and multiple Walsh codes is obtained, and it is confirmed that the modulation mode of the F-PDCHs is the 16QAM, a 16 QAM reference level calculator 350 estimates the reference level using reference symbol energy values corresponding to the obtained multiple Walsh codes. A symbol demapper 348 performs 16QAM demapping to the symbols selected by the Walsh selector 344 using the estimated reference level. Therefore, the structure of the demodulator of FIG. 6 eliminates a process delay time for estimating the 16QAM reference level, so that the whole demodulation time is shortened.

The CCMW demodulating section 302 shown in FIG. 6 yields the same demodulation results as that of FIG. 5 using the typical fingers and symbol combiners. To be more specific, firstly, the symbol signals output from the multipath symbol combiner 230 of FIG. 5 are represented as Equation 1 as follows:

$$S^k_{SCPW}(n) = \sum_{i=1}^{NOF} P_i^*(n) \times \left( \sum_{j=1}^{32} R_{ij}(n) \cdot C_{jk} \right) \quad \text{Equation 1}$$

where NOF is the number of fingers.

Further, when in the CCMW demodulating section 302 of FIG. 6 according to the present invention, channel compensation through the pilot filter 308 is performed by a unit of 32 chips, the symbol signals output from the Walsh decovers 326, 328 and 330 are represented as Equation 2 as follows:

$$S^k_{CCMW}(n) = \sum_{j=1}^{32} C_{jk} \times \left( \sum_{i=1}^{NOF} P_i^*(n) \cdot R_{ij}(n) \right) \quad \text{Equation 2}$$

The symbols used in Equations 1 and 2 will be defined as follows:

i: finger index;

j: chip index (1<j<32);

$R_{ij}(n)$: $j^{th}$ chip signal of the $n^{th}$ symbol with respect to signals received at the finger i;

$C_{jk}$: $j^{th}$ chip of the $k^{th}$ walsh code $W_k^{32}$ having a length of 32 chips;

$P_i^*(n)$: conjugate of outputs of pilot filter of the finger i;

$S_{SCPW}^k(n)$: $n^{th}$ symbol output for the $k^{th}$ walsh code $W_k^{32}$ in the SCPW demodulator; and $S_{CCMW}^k(n)$: $n^{th}$ symbol output for the $k^{th}$ walsh code $W_k^{32}$ in the CCMW demodulator according to the present invention.

Comparing Equation 1 with Equation 2, it can be seen that the construction of FIG. 6 outputs the same results as that of FIG. 5.

As mentioned, the CCMW demodulating section 302 attains the same channel demodulation capability and a gain in the design structure. This gain in the design structure can be measured by a process delay time, a memory usage, complexity and so on. Typically, an internal memory used in the communication equipment is a one-port Static Random Access Memory (SRAM), an input and an output for a memory cell are formed in series. Therefore, the process delay time is dependent on input/output of a buffer memory. When by one clock one symbol or one chip signal is input or output, and a FIFO delay is equal, the SCPW demodulator shown in FIG. 5 and the CCMW demodulator shown in FIG. 6 in accordance with the present invention have their performance represented in Table 1 below.

The following Table 1 compares a demodulation process time and a memory usage until decoding is performed on each data path of the demodulator, and complexity. Upon calculating each parameter under a transmission condition for maximizing the demodulation process time and the memory usage, the transmission condition is that the modulation mode is 16QAM, the number of Walsh codes is 28, and a packet has a length of 4 slots. In addition, a delay caused by symbol combination or chip combination is not taken into consideration, and a chip is equal to a bit width of a symbol.

shift register 342-1 synchronizes 28 bit mask information with the demodulation symbol input clock signal, i.e., iDEMOD_SYM_OUT_CLK and performs cyclic-shifting of the synchronized resultants, in which the 28 bit mask information represents Walsh codes assigned to packet data channels from among all 28 Walsh codes. The shifted outputs of the shift register 342-1 are subjected to an AND operation with the symbols stored on the symbol buffer 340 by means of an AND gate 342-3 to select modulation symbols. The selected modulation symbols are synchronized with an oDEMOD_SYM_CLK as a demodulation symbol output clock signal, which is generated as a result of the AND operation of shifted outputs of the shift register 342-1 with the demodulation symbol input clock signal, i.e., iDEMOD_SYM_OUT_CLK by means of the AND gate 342-2.

Meanwhile, in a 16QAM reference level calculator 350, a Walsh selector 350-1 sequentially selects the corresponding

TABLE 1

| | Max. demodulation process time | Memory usage | Complexity (NOF:Number Of Fingers) |
|---|---|---|---|
| SCPW demodulator (FIG. 5) | FIFO delay + 26880 clocks = 4*(1344 + 1344*4) | symbol FIFO + 8064 symbols = 5*1344 + 1344 | 28 combiners/data path<br>very complicated structure of a finger<br>28*NOF Walsh decovers<br>28 times Walsh decovering per slot |
| CCMW demodulator (FIG. 6) | FIFO delay + 21504 clocks = 4*(1344*4) | chip FIFO (=32/28*symbol FIFO) + 6860 symbols = 5*(1344 + 28) | one combiner/data path<br>simple structure of a finger<br>28 Walsh decovers<br>28 times Walsh decovering per slot |

Figure 7:
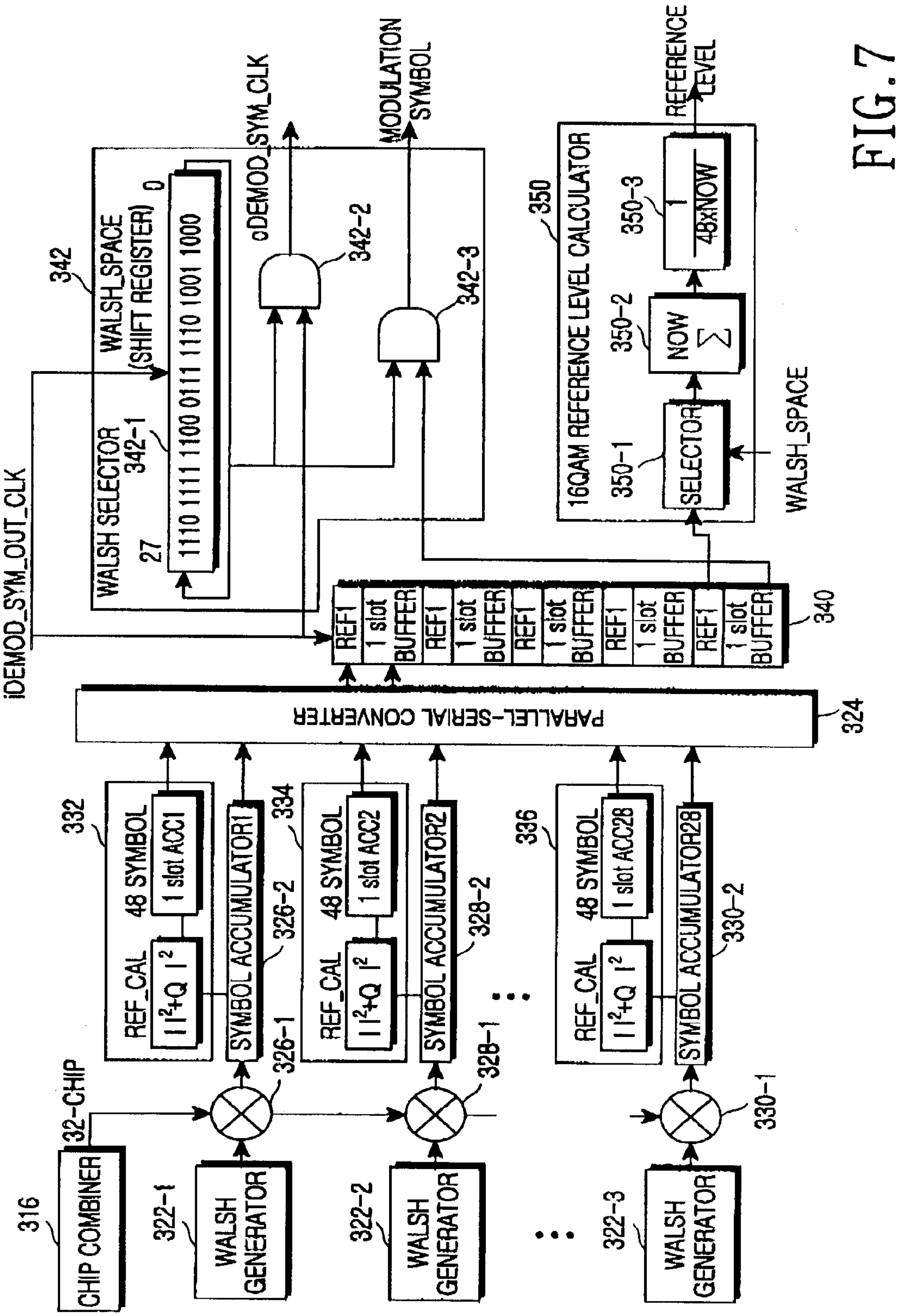
FIG. 7 is a detailed block diagram illustrating an example of components of a multiple Walsh demodulator in a CCMW demodulating section according to an embodiment of the present invention.

FIG. 7 is a detailed block diagram illustrating an example of components of a multiple Walsh demodulator 320 in a CCMW demodulating section 302 according to an embodiment of the present invention.

Referring to FIG. 7, 28 symbol accumulators 326-2, 328-2 and 330-2 allow chips combined by a chip combiner 316 to be input, and accumulate to output symbols decovered with Walsh codes which are generated at respective Walsh generators 322-1, 322-2 and 322-3. The symbols output from each slot are sequentially stored on the corresponding memory area of a symbol buffer 340 by a parallel-serial converter 324. While the Walsh decovering proceeds, 28 REF CALs 332, 334 and 336 calculate the accumulated average energy of 48 decovered symbols per each slot, and store the calculated resultants on the corresponding memory area of the symbol buffer 340.

The symbol buffer 340 may be include five one-port input/output memory cells, each of which can store 28 Walsh codes*48 symbols. Alternatively, the symbol buffer 340 may include one-port input/output RAM, in which memory areas corresponding to each slot are divided to store symbols received while demapping is performed. The symbol buffer 340 shown in FIG. 7 can store 6720 symbols (5 slots*28 Walsh codes*48 symbols) and 140 average values (5 slots*28 walsh codes), and outputs the stored symbols by synchronizing with an iDEMOD_SYM_OUT_CLK as a demodulation symbol input clock signal.

When decoding of F-PDCCH is completed and information on a modulation mode of F-PDCHs and multiple Walsh codes is known, a Walsh selector 342 performs Walsh selection for extracting symbols corresponding to the assigned multiple Walsh codes from the symbol buffer 340. The Walsh selector 342 includes a shift register 342-1. The Walsh symbols from among the Walsh symbols output from the symbol buffer 340 in reference to a Walsh space standing for the Walsh codes assigned to packet data channels, and a combiner 350-2 combines the selected Walsh symbols. Then, a divider 350-3 divides an output of the combiner 350-2 by a product of the number of Walsh symbols per each slot, i.e. 48, and the number of Walsh codes (NOW) assigned to packet data channels, and outputs the divided resultant as a reference level, which is provided to a symbol demapper 348 for 16QAM demodulation.

The demodulator shown in FIG. 6 makes use of the priori-decovering method which performs Walsh selection and parallel-serial conversion when the information on the Walsh codes is known after Walsh decovering is performed. Therefore, the demodulator always performs the Walsh decovering for all 28 Walsh codes and estimation of a 16QAM reference level, without knowing whether or not F-PDCHs are received to the mobile station itself or whether or not a modulation mode of the 16QAM is used.

In fact, a probability that the F-PDCHs received from a base station are received to a particular mobile station is in inverse proportion to the number of the mobile stations or users, and is relatively low. For example, assuming that 20 mobile stations are served from one base station, a quantity of data transmitted to the particular mobile station is only about 1/20 of the total quantity of data transmitted from the base station. Moreover, because the data are not always transmitted, the time when the data are transmitted to the particular mobile station will take a very small portion of the whole service time. Nevertheless, the demodulator shown in FIG. 6 always performs the Walsh decovering with respect to received signals, and the resulting unnecessary consumption of electric power occurs.

Further, the demodulator of FIG. 6 makes use of the 28 REF CALs 332, 334 and 336 in order to shorten a time to estimate the reference level for the 16QAM modulation mode. Even though the number of the Walsh codes assigned to packet data channels is taken into consideration, a probability that the modulation mode of the data channels falls to the 16QAM is not really high. For this reason, calculating the reference level with respect to all 28 Walsh codes at all times acts as a main factor for consumption of electric power.

In this regard, the demodulator shown in FIG. 6 has an advantage in that it can decrease a demodulation time, but a problem in that it can increase consumption of electric power. To cope with this problem, only when it is determined that as a result of decoding of F-PDCCH, data transmitted to the mobile station itself is present, that is, only when it is determined that F-PDCHs are assigned to the mobile station itself, the multiple Walsh demodulator is operated. As a result, it is possible to save electric power which is spent for the multiple Walsh demodulation performed unnecessarily for each slot and for operation for estimating the 16QAM reference level.

Figure 8:
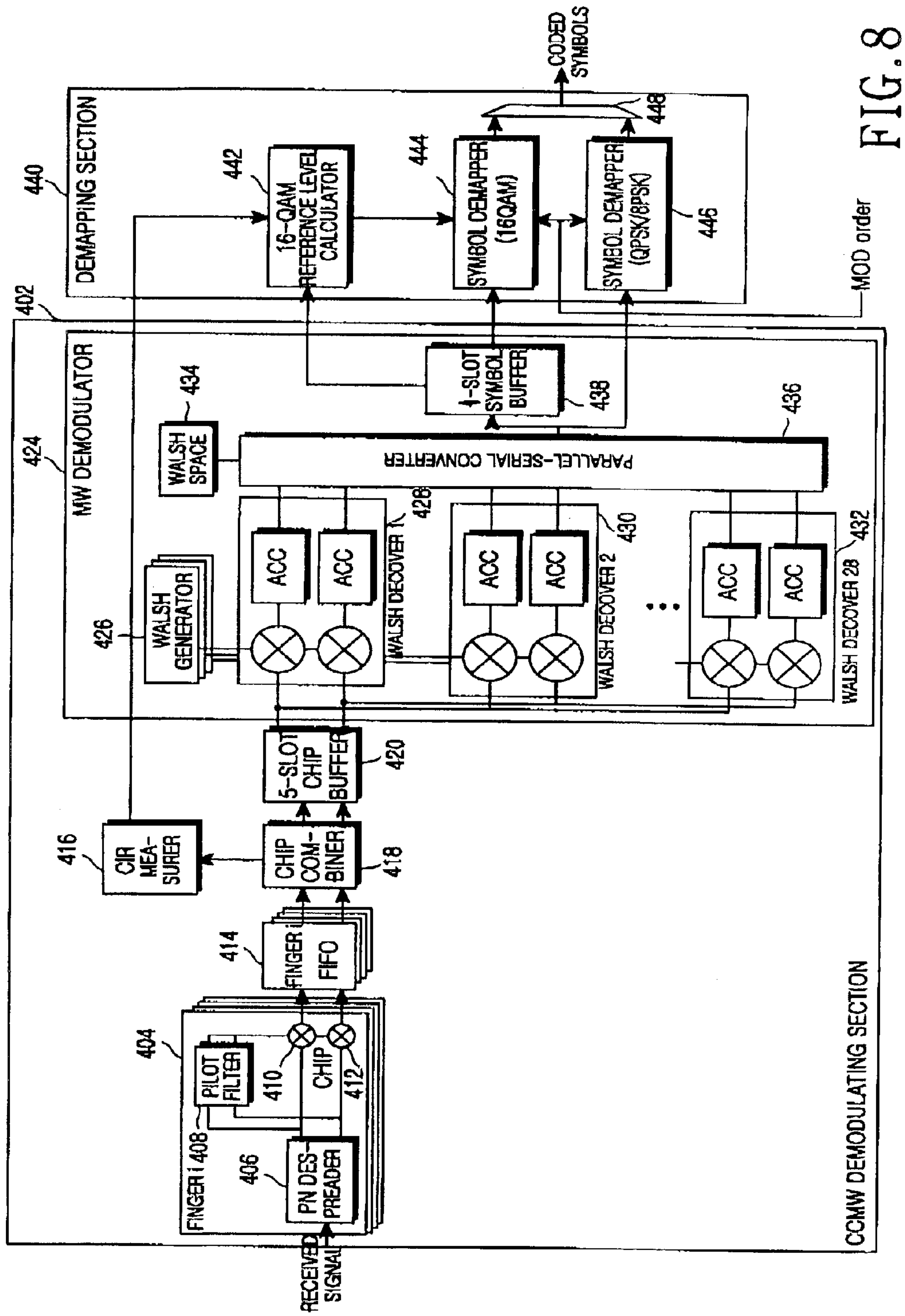
FIG. 8 is a block diagram illustrating an example of components of a demodulator for a mobile station according to an embodiment of the present invention, in which the demodulator includes a chip combining multiple Walsh (CCMW) demodulating section in order to demodulate F-PDCHs of CDM mode.

FIG. 8 is a detailed block diagram illustrating an example of components of a demodulator for a mobile station according to another embodiment of the present invention, in which the demodulator includes a chip combining multiple Walsh (CCMW) demodulating section 402 in order to demodulate F-PDCHs of CDM mode.

Referring to FIG. 8, signals received from a base station are input into a plurality of slim fingers 404, respectively, and then subjected to despreading with PN codes assigned to the corresponding base station at a PN despreader 406. The despread signals are input into a pilot filter 408 and multipliers 410 and 412 for respective I and Q channels. The pilot filter 408 extracts pilot components included in the despread chip signals to obtain channel estimation values, and thus the obtained values are input into the multipliers 410 and 412 The multipliers 410 and 412 perform channel compensation for a chip level by multiplying outputs of the pilot filter 408 by the despread chip signals, and then store the performed resultants on the corresponding one of a plurality of finger FIFOs 414. (The multipliers may be referred to channel compensators) The finger FIFOs 414 is for compensating for a multipath delay offset difference between multiple paths caused by the slim fingers 404.

A chip combiner 418 combines the chip signals stored on the plurality of finger FIFOs 414, and causes the combined chip signals to be stored on a 5-slot chip buffer 420 and provides the combined chip signals to a CIR measurer 416.

The 5-slot chip buffer 420 stores the chip signals for a time of five slots in order to perform the priori-decovering. The combined chip signals are stored on the 5-slot chip buffer 420 until decoding of F-PDCCH is completed and information on MAC_ID, the number of Walsh codes and a modulation mode is known.

When decoding of F-PDCCH is completed and information on MAC_ID, the number of Walsh codes and a modulation mode is obtained, and MAC_ID obtained as a result of demodulation is its own, that is, when F-PDCHs are assigned to its own and it is confirmed that it is necessary to demodulate the F-PDCHs, the multiple Walsh demodulator 424 decovers the chip signals stored on the chip buffer 420 and outputs. The decovered outputs will be referred to as demodulation symbols or walsh symbols.

To be more specific about an operation of the multiple Walsh demodulator 424, the corresponding Walsh generators of 28 Walsh generators 426 generate only Walsh codes assigned to the F-PDCHs in reference to a Walsh space 434 which stores the multiple Walsh codes obtained as a result of decoding of the F-PDCCH. This is in contrast to the fact that the Walsh generators of FIGS. 4 and 5 generate all 28 Walsh codes within a possible extent. The generated Walsh codes are provided to the corresponding Walsh decovers of $1^{st}$ to $28^{th}$ Walsh decovers 428, 430 and 432.

The corresponding Walsh decovers perform decovering of the chip signals, which are read out of the 5-slot chip buffer 420, with the provided Walsh codes to generate Walsh symbols, and then provides the generated Walsh symbols to a parallel-serial converter 436. The parallel-serial converter 436 converts the symbols, which are output from the corresponding decovers in parallel, in series.

Then, if it is determined that as a result of decoding of the F-PDCCH, as a modulation mode of the F-PDCHs, any other modulation mode is used instead of 16QAM, the symbols selected by the parallel-serial converter 436 are directly input into a QPSK/8PSK symbol demapper 446 of a demapping section 440 without being input into the one-slot symbol buffer 438, and then demapped to the corresponding coded symbols according to QPSK or 8PSK.

However, if it is determined that 16QAM is used, the symbols selected by the parallel-serial converter 436 are stored on the one-slot symbol buffer 438 until a 16QAM reference level is estimated. That is, a 16QAM reference level calculator 442 obtains a reference level for a time of one slot with both results which the CIR measurer 416 measures using the chip signals combined by the chip combiner 418 and the symbol data stored on the one-slot symbol buffer 438, and then inputs the obtained reference level into a 16QAM symbol demapper 444. The 16QAM symbol demapper 444 demaps the symbol data stored on the one-slot symbol buffer 438 according to the 16QAM into the corresponding coded symbols using the reference level calculated by the 16QAM reference level calculator 442. Outputs of either the QPSK/8PSK symbol demapper 446 or the 16QAM symbol demapper 444 are multiplexed by a multiplexer 448 and finally output.

The CCMW demodulator 402 of FIG. 8 operated as mentioned above checks that after the F-PDCCH is decoded, the F-PDCHs are assigned to the mobile station itself, and then drives the multiple Walsh demodulator 424, thereby performing decovering for desired Walsh codes. This structure is implemented by arranging the chip buffer 420 in front of the multiple Walsh demodulator 424, without using the symbol buffer (see 340 in the FIG. 6) storing demodulated symbols.

The CCMW demodulator 402 of FIG. 8 has the total demodulation process time increased to a certain extent due to the process time needed to estimate the one-slot 16QAM reference level when the 16QAM is used, but has the process time as fast as that of the CCMW demodulator 302 of FIG. 6 when the QPSK/8PSK is used. Therefore, in the F-PDCH in which the 16QAM mode is not much used, it is possible to reduce undesired consumption of electric power without a great increase of the demodulation time.

In data channels using multiple Walsh codes for transmitting data at a high speed in a high-speed wireless data transmission system, there has proposed CCMW demodulation mode in which packet data channels are efficiently demodulated using slim fingers, a chip combiner and a multiple Walsh demodulator. However, according to the present invention, even when CDM is used to support a packet data service for a plurality of users, let alone TDM, packet data channels can be efficiently demodulated. In addition, a receiver needed to modulate high-speed packet data channels can reduce its overhead (complexity and demodulation time), and thus a more efficient receiver can be implemented. Further, the present invention can reduce consumption of electric power spent in a mobile station receiver needed to modulate high-speed packet data channels, and thus the receiver can be implemented in a more efficient manner.

While the invention has been shown and described with reference to certain embodiments thereof, various modifications may be made without departing form the scope of the invention. That is, to perform efficient demodulation of channels using multiple Walsh codes, various types of demodulators can be constructed using slim fingers and a chip combiner proposed in the present invention. Further, multiple Walsh demodulators constructed for multiple Walsh demodulation can be reconstructed in various types in order to shorten the demodulation time and estimate a reference level. Therefore, the scope of the invention should not be defined by the specific embodiments disclosed, but by the claims appended hereto and their equivalents.

What is claimed is:

1. A system for demodulating signals received through packet data channels using information on the packet data channels in a wireless packet data communication system, in which the information is received through packet data control channels and the communication system supports code division multiplexing, the system for demodulating signals comprising:

a plurality of fingers for processing signals received from a transmitter as inputs, for performing despreading with pre-assigned spreading codes and outputting the despread chip signals;

a chip combiner for combining the chip signals output from the plurality of fingers; and a multiple Walsh demodulator for generating Walsh symbols performing Walsh decovering of each of the chip signals combined by the chip combiner using all Walsh codes available to the packet data channels, and when decoding of the packet data control channels is completed and information on multiple Walsh codes assigned to the packet data channels is obtained, selecting and outputting at least one Walsh symbol corresponding to the multiple Walsh codes from among the Walsh symbols.

2. A system for demodulating signals according to claim 1, wherein the multiple walsh demodulator comprises:

a plurality of Walsh generators for generating all Walsh codes available to the packet data channels;

a plurality of Walsh decovers for performing Walsh decovering of each of the chip signals combined by the chip combiner with the Walsh codes generated by the Walsh generators to output Walsh symbols;

a symbol buffer for storing the Walsh symbols output from the plurality of Walsh decovers for a predetermined number of slots until decoding of the packet data control channels is completed; and a Walsh selector for selecting and outputting, when decoding of the packet data control channels is completed and information on multiple Walsh codes assigned to the packet data channels is obtained, at least one Walsh symbol corresponding to the multiple Walsh codes from among the Walsh symbols stored on the symbol buffer.

3. A system for demodulating signals according to claim 2, wherein the symbol buffer includes a plurality of memory cells for storing each of the Walsh symbols according to each slot for the predetermined number of slots, the Walsh symbols being output from the Walsh decovers.

4. A system for demodulating signals according to claim 1, wherein the fingers each comprise:

a despreader for multiplying signals received from the transmitter by the spreading codes to perform despreading;

a pilot filter for detecting pilot components contained in the despread signals to obtain channel estimation values; and a channel compensator for multiplying the despread signals by the channel estimation values to perform channel compensation.

5. A system for demodulating signals according to claim 1, further comprising a plurality of first input first output memories (FIFOs) corresponding to the plurality of fingers, wherein the FIFOs store each of the chip signals output from the plurality of fingers and output the stored resultants to the chip combiner, so as to compensate for a delay offset difference between multiple paths caused by the fingers.

6. A system for demodulating signals received through packet data channels using information on the packet data channels in a wireless packet data communication system, in which the information is received through packet data control channels and the communication system supports code division multiplexing, the system for demodulating signals comprising:

a plurality of fingers for processing signals received from a transmitter as inputs and for performing despreading with pre-assigned spreading codes and outputting the despread chip signals;

a chip combiner for combining the chip signals output from the plurality of fingers;

a multiple walsh demodulator for generating Walsh symbols for performing Walsh decovering of each of the chip signals combined by the chip combiner using all Walsh codes available to the packet data channels, and when decoding of the packet data control channels is completed and information on multiple Walsh codes assigned to the packet data channels is obtained, selecting and outputting at least one Walsh symbol corresponding to the multiple Walsh codes from among the Walsh symbols; and a demapping section for demapping at least one Walsh symbol output from the multiple Walsh demodulator according to a modulation mode of the packet data channels obtained by completing decoding of the packet data control channels.

7. A system for demodulating signals according to claim 6, wherein the multiple Walsh demodulator comprises:

a plurality of Walsh generators for generating all Walsh codes available to the packet data channels;

a plurality of Walsh decovers for performing Walsh decovering of each of the chip signals combined by the chip combiner with the Walsh codes generated by the Walsh generators to output Walsh symbols;

a plurality of reference symbol energy calculators for processing the Walsh symbols output from the plurality of Walsh decovers as inputs to calculate each of reference symbol energy values;

a symbol buffer for storing both the Walsh symbols output from the plurality of Walsh decovers for a predetermined number of slots and the reference symbol energy values output from the plurality of reference symbol energy calculators, until decoding of the packet data control channels is completed; and a Walsh selector for selecting, when decoding of the packet data control channels is completed and information on multiple Walsh codes assigned to the packet data channels is obtained, at least one Walsh symbol corresponding to the multiple Walsh codes from among the stored Walsh symbols and at least one reference symbol energy value corresponding to the multiple Walsh codes from among the reference symbol energy values and for outputting the selected resultants to the demapping section.

8. A system for demodulating signals according to claim 7, wherein the plurality of reference symbol energy calculators calculate reference symbol energy values for the Walsh symbols output from the plurality of Walsh decovers per each slot.

9. A system for demodulating signals according to claim 7, wherein the symbol buffer comprises:

a plurality of memory cells for storing each of the Walsh symbols according to each slot for the predetermined number of slots, the Walsh symbols being output from the Walsh decovers; and a plurality of reference symbol energy buffers for storing each of the reference symbol energy values according to each slot for the predetermined number of slots, the reference symbol energy values being output from the plurality of reference symbol energy calculators.

10. A system for demodulating signals according to claim 6, wherein the fingers each comprise:

a despreader for multiplying signals received from the transmitter by the spreading codes to perform despreading;

a pilot filter for detecting pilot components contained in the despread signals to obtain channel estimation values; and a channel compensator for multiplying the despread signals by the channel estimation values to perform channel compensation.

11. A system for demodulating signals according to claim 6, further comprising a plurality of first input first output memories (FIFOs) corresponding to the plurality of fingers, wherein the FIFOs stores each of the chip signals output from the plurality of fingers and outputs the stored resultants to the chip combiner, so as to compensate for a delay offset difference between multiple paths caused by the fingers.

12. A system for demodulating signals according to claim 6, wherein the demapping section comprises:

a reference level calculator for processing at least one reference symbol energy value and a carrier to interference ratio (CIR) of the combined chip signals as inputs and for calculating a reference level of at least one Walsh symbol; and a symbol demapper for demapping the Walsh symbols output from the multiple Walsh demodulator to output coded symbols using the reference level of at least one Walsh symbol if necessary according to the modulation mode of the packet data channels.

13. A system for demodulating signals received through packet data channels using information on the packet data channels in a wireless packet data communication system, in which the information is received through packet data control channels and the communication system supports code division multiplexing, the system for demodulating signals comprising:

a plurality of fingers for processing signals received from a transmitter as inputs and for performing despreading with pre-assigned spreading codes and outputting the despread chip signals;

a chip combiner for combining the chip signals output from the plurality of fingers;

a chip buffer for storing the chip signals combined by the chip combiner; and a multiple Walsh demodulator for outputting, when decoding of the packet data control channels is completed and information on multiple Walsh codes assigned to the packet data channels is obtained, at least one Walsh symbol performing Walsh decovering of the chip signals stored on the chip buffer using information on the multiple Walsh codes.

14. A system for demodulating signals according to claim 13, wherein the chip buffer stores the chip signals combined by the chip combiner for a predetermined number of slots until decoding of the packet data control channels is completed.

15. A system for demodulating signals according to claim 13, wherein the multiple Walsh demodulator comprises:

a plurality of Walsh generators for generating at least one Walsh code corresponding to the multiple Walsh codes assigned to the packet data channels; and a plurality of Walsh decovers for outputting at least one Walsh symbol performing Walsh decovering of each of the chip signals stored on the chip buffer with at least one Walsh code generated by the Walsh generators.

16. A system for demodulating signals according to claim 13, further comprising a plurality of first input first output memories (FIFOs) corresponding to the plurality of fingers, wherein the FIFOs stores each of the chip signals output from the plurality of fingers and outputs the stored resultants to the chip combiner, so as to compensate for a delay offset difference between multiple paths caused by the fingers.

17. A system for demodulating signals received through packet data channels using information on the packet data channels in a wireless packet data communication system, in which the information is received through packet data control channels and the communication system supports code division multiplexing, the system for demodulating signals comprising:

a plurality of fingers for processing signals received from a transmitter as inputs and for performing despreading with pre-assigned spreading codes and outputting the despread chip signals;

a chip combiner for combining the chip signals output from the plurality of fingers;

a chip buffer for storing the combined chip signals;

a multiple Walsh demodulator for outputting, when decoding of the packet data control channels is completed and information on multiple Walsh codes assigned to the packet data channels is obtained, at least one Walsh symbol performing Walsh decovering of the chip signals stored on the chip buffer using information on the multiple Walsh codes; and a demapping section for demapping at least one Walsh symbol output from the multiple Walsh demodulator according to a modulation mode of the packet data channels obtained by completing decoding of the packet data control channels.

18. A system for demodulating signals according to claim 17, wherein the chip buffer stores the chip signals combined by the chip combiner for a predetermined number of slots until decoding of the packet data control channels is completed.

19. A system for demodulating signals according to claim 17, wherein the multiple Walsh demodulator comprises:

a plurality of Walsh generators for generating at least one Walsh code corresponding to the multiple Walsh codes assigned to the packet data channels; and a plurality of Walsh decovers for performing Walsh decovering of each of the chip signals stored on the chip buffer with at least one Walsh code generated by the Walsh generators to output at least one Walsh symbol.

20. A system for demodulating signals according to claim 19, further comprising a symbol buffer for storing at least one Walsh symbol until measurement of a carrier to interference ratio (CIR) of the chip signals combined by the chip combiner is completed, if necessary according to the modulation mode of the packet data channels.

21. A system for demodulating signals according to claim 17, wherein the demapping section comprises:

a reference level calculator for calculating a reference level of at least one Walsh symbol using a carrier to interference ratio (CIR) of the combined chip signals if necessary according to the modulation mode of the packet data channels;

a 16QAM symbol demapper for demapping at least one Walsh symbol according to 16QAM to output coded symbols using the reference level of at least one Walsh symbol; and a QPSK/8PSK symbol demapper for demapping at least one Walsh symbol according to any one of QPSK and 8PSK to output coded symbols.

22. A system for demodulating signals according to claim 17, wherein the fingers each comprise:

a despreader for multiplying signals received from the transmitter by the spreading codes to perform despreading;

a pilot filter for detecting pilot components contained in the despread signals to obtain channel estimation values; and a channel compensator for multiplying the despread signals by the channel estimation values to perform channel compensation.

23. A system for demodulating signals according to claim 17, further comprising a plurality of first input first output memories (FIFOs) corresponding to the plurality of fingers, wherein the FIFOs stores each of the chip signals output from the plurality of fingers and outputs the stored resultants to the chip combiner, so as to compensate for a delay offset difference between multiple paths caused by the fingers.

24. A method for demodulating signals received through packet data channels using information on the packet data channels in a packet data channel receiver of a wireless packet data communication system, in which the information is received through packet data control channels and the communication system supports code division multiplexing, the method for demodulating signals comprising the steps of:

a) processing signals received from a transmitter as inputs, performing despreading with pre-assigned spreading codes, and outputting the despread chip signals;

b) combining the chip signals; and c) generating Walsh symbols performing Walsh decovering of each of the combined chip signals using all Walsh codes available to the packet data channels, and when decoding of the packet data control channels is completed and information on multiple Walsh codes assigned to the packet data channels is obtained, selecting and outputting at least one Walsh symbol corresponding to the multiple Walsh codes from among the Walsh symbols.

25. A method for demodulating signals according to claim 24, wherein the step c) comprises the sub-steps of:

generating all Walsh codes available to the packet data channels;

performing Walsh decovering of each of the combined chip signals with the generated Walsh codes to output Walsh symbols;

storing the Walsh symbols generated through decovering for a predetermined number of slots until decoding of the packet data control channels is completed; and when decoding of the packet data control channels is completed and information on multiple Walsh codes assigned to the packet data channels is obtained, selecting and outputting at least one Walsh symbol corresponding to the multiple Walsh codes from among the stored Walsh symbols.

26. A method for demodulating signals according to claim 24, wherein the step a)comprises the sub-steps of:

multiplying signals received from the transmitter by the spreading codes to perform despreading;

detecting pilot components contained in the despread signals to obtain channel estimation values; and multiplying the despread signals by the channel estimation values to perform channel compensation.

27. A method for demodulating signals according to claim 24, further comprising the step of: d) demapping at least one Walsh symbol according to a modulation mode of the packet data channels obtained by completing decoding of the packet data control channels.

28. A method for demodulating signals according to claim 27, further comprising the steps of: e) processing the at least one Walsh symbol as inputs to calculate each of reference symbol energy values, storing the reference symbol energy values until decoding of the packet data control channels is completed, and when decoding of the packet data control channels is completed and information on multiple Walsh codes assigned to the packet data channels is obtained, selecting and outputting at least one reference symbol energy value corresponding to the multiple Walsh codes from among the reference symbol energy values.

29. A method for demodulating signals according to claim 27, wherein the step d) performs demapping of at least one Walsh symbol with a reference level obtained using a carrier to interference ratio (CIR) of the combined chip signals and at least one Walsh symbol, if necessary according to the modulation mode of the packet data channels.

30. A method for demodulating signals received through packet data channels using information on the packet data channels in a packet data channel receiver of a wireless packet data communication system, in which the information is received through packet data control channels and the communication system supports code division multiplexing, the method for demodulating signals comprising the steps of:

a) processing signals received from a transmitter as inputs, performing despreading with pre-assigned spreading codes, and outputting the despread chip signals;

b) combining the chip signals;

c) storing the combined chip signals; and d) when decoding of the packet data control channels is completed and information on multiple Walsh codes assigned to the packet data channels is obtained, outputting at least one Walsh symbol performing Walsh decovering of the stored chip signals using information on the multiple Walsh codes.

31. A method for demodulating signals according to claim 30, wherein the step c) stores the combined chip signals for a predetermined number of slots until decoding of the packet data control channels is completed.

32. A method for demodulating signals according to claim 30, wherein the step d) comprises the sub-steps of:

generating at least one Walsh code corresponding to the multiple Walsh codes assigned to the packet data channels; and performing Walsh decovering of each of the stored chip signals with at least one Walsh code to output at least one Walsh symbol.

33. A method for demodulating signals according to claim 30, further comprising the step of: e) demapping at least one Walsh symbol according to a modulation mode of the packet data channels obtained by completing decoding of the packet data control channels.

34. A method for demodulating signals according to claim 33, wherein the step e) performs demapping of at least one Walsh symbol with a reference level obtained using a carrier to interference ratio (CIR) of the combined chip signals and at least one Walsh symbol, if necessary according to the modulation mode of the packet data channels.

* * * * *